United States Patent [19]
Phenicie et al.

[11] Patent Number: 5,204,149
[45] Date of Patent: Apr. 20, 1993

[54] METHOD AND APPARATUS FOR MAKING DOUBLE WALL CONTAINERS

[75] Inventors: Ronald W. Phenicie; Peter E. Dahlquist, both of Warrenton, Va.

[73] Assignee: Case Designers Corporation, Warrenton, Va.

[21] Appl. No.: 637,542

[22] Filed: Jan. 4, 1991

[51] Int. Cl.[5] .............................................. B32B 3/00
[52] U.S. Cl. ...................................... 428/57; 428/58; 428/60; 428/61; 52/536; 52/588; 220/1.5
[58] Field of Search ...................... 428/60, 61, 58, 57; 52/588, 536; 220/1.5, 4.26, 4.27, 4.29, 6, 7; 160/232; 404/41; 403/335, 336, DIG. 10

[56] References Cited

U.S. PATENT DOCUMENTS

| | | | |
|---|---|---|---|
| 3,039,575 | 6/1962 | Graham | 52/578 |
| 3,332,192 | 7/1967 | Kessler | 52/588 |
| 3,884,444 | 5/1975 | Dashew | 52/588 |
| 4,091,950 | 5/1978 | Craven | 220/1.5 |
| 4,214,669 | 7/1980 | McQuiston | 220/1.5 |
| 4,577,772 | 3/1986 | Bigliardi | 220/1.5 |
| 5,050,362 | 9/1991 | Tal | 52/588 |

Primary Examiner—Ellis P. Robinson
Assistant Examiner—Nasser Ahmad
Attorney, Agent, or Firm—Kenyon & Kenyon

[57] ABSTRACT

The individual structural member of the invention includes a pair of parallel panels which are spaced from each other to define a cavity therebetween. The panels are staggered in the longitudinal direction so that an end section of one panel extends beyond an end of the other panel and vice versa to form a front extension section and a rear extension section of the structural member. The non-extension end edge of each panel is connected to the opposing panel by a flat wall which is normal to the plane of both panels. Each extension section is provided with a flange. The front section flange of one structural member is adapted to interlock with the rear section flange of another structural member so that the structural members can be assembled in end to end fashion with the panels of one structural member being coplanar with the panels of adjoining structural members to form a double wall of, for example, a container.

36 Claims, 6 Drawing Sheets

METHOD AND APPARATUS FOR MAKING DOUBLE WALL CONTAINERS

BACKGROUND OF THE INVENTION

1. Field of the Invention

The invention relates to structural members which can be interlocked in end to end fashion to assemble a double wall. More particularly, the invention elates to such structural members which can be assembled into a container for the transportation and storage of goods.

2. Description of Related Art

Containers used for the transportation and storage of myriad goods typically are configured for mounting onto a truck, bed or pallet. Such containers should be movable from the truck and for placement onto another transportation vehicle such as a rail box car, an aircraft, or a ship for an overseas destination.

One major drawback of conventional containers is that they are of a fixed standard size that cannot be altered to accommodate varying load sizes or transportation vehicle dimensions. At a shipping port or other loading site it is not always feasible to construct conventional containers according to particular dimensional specifications.

In the case of double wall containers, it is not possible to select at the loading site whether the cavity between the walls is to be flushed with, for example, hot air or cold air to help maintain the temperature inside the container, or, whether the cavity is to contain foam, other insulating materials or electrical wiring and the like. Further drawbacks of conventional containers are that they often do not have substantial vertical strength for stacking purposes and that they are often not effectively sealed against external environment.

The invention overcomes many of the deficiencies discussed above. Structural members having a double wall configuration are interlocked in end to end fashion to readily assemble custom sized containers.

The individual structural member of panel of the invention includes a pair of parallel walls spaced from each other to define a cavity therebetween. The panels are staggered in the longitudinal direction so that an end section of one panel extends beyond an end of an adjacent panel and vice versa to form a front extension section and a rear extension section of the structural member formed from a group of panels.

Each extension section is provided with a front and rear flange, each having a different configuration for complementary interaction. The front flange of one panel is adapted to interlock with the rear flange of another panel so that the panels can be assembled in end to end fashion with the walls of one panel being co-planar with the walls of an adjoining panel. Each panel has a groove parallel to flange in which case the end of each extension section has complementary lip adapted to be received within the groove of an adjoining panel. This permits assembly of the panels in an end to end relationship with improved stability.

Certain panels have one edge defined by an end wall without any channels, grooves, projections or lips. These panels, referred to as end panels, are attached to other panels described above with interlocking extensions with the relatively smooth surface defining one end, exposed for attachment to a hinge or corner bracket.

These wall panels can be joined at their ends by hinges to form a foldable and portable container. Elongated channelled members are configured to fit over the tops and bottoms of the assembled container double wall panels to stabilize the container and enclose the edges. For vertical stacking purposes, elongated channelled members can be affixed to bottoms of the assembled container walls with their channels depending outwardly and adapted to receive the top of the walls of a container stacked below, or, in the case of the bottom container a pallet which can function as a floor.

DESCRIPTION OF THE INVENTION

Figure 2:
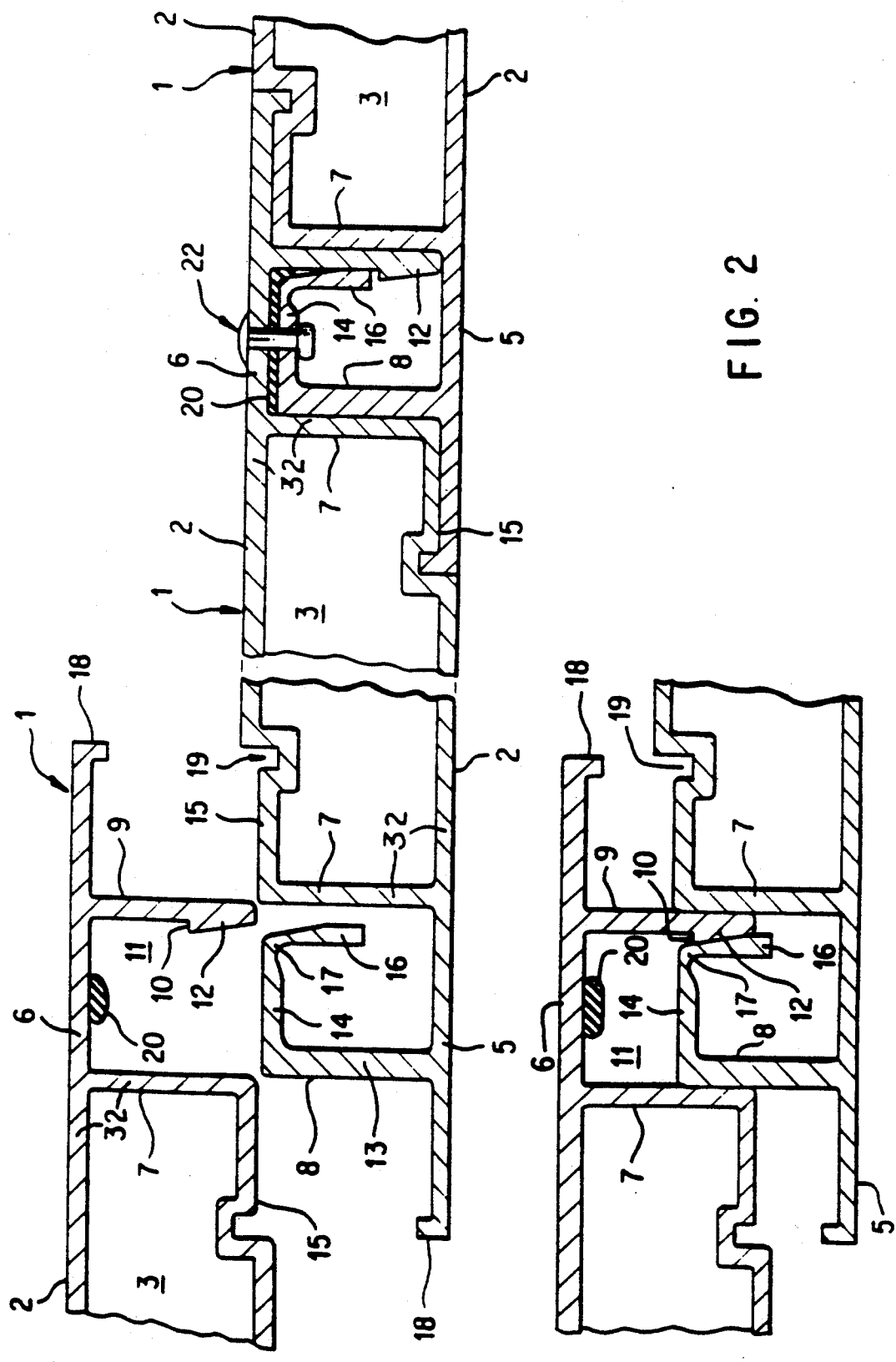
FIG. 2 is a detailed cross-sectional view of structural members in accordance with the invention being assembled to form a double wall.

Referring to FIG. 2 a detailed cross-sectional view of panels 1 in accordance with the invention is illustrated. Panel 1 includes a pair of parallel walls 2 spaced apart to define a cavity 3 therebetween. As illustrated, walls 2 are substantially planar except for the interlocking non-extension portion described hereinafter. As illustrated, walls 2 of a structural member or panel 1 are staggered in the longitudinal direction so that an end section of one panel extends beyond an end section of the opposing panel and vice versa to define rear extension 5 and front extension 6 of panel 1.

Opposing walls 2 of panel 1 are joined by connecting walls 7 normal to the plane of walls 2. As illustrated in FIG. 2, each wall 7 connects the end of non-extension end section 15 of one wall to the other wall to further circumscribe the cavity 3.

Rear extension 5 of a structural member 1 has a "J" flange 8 adapted to interlock with a flange wall 9 belonging to the front extension 6 of another panel. Of course, it should be appreciated that positions can be rearranged so that flange 9 belongs to the front extension and "J" flange 8 belongs to the rear extension. This can be accomplished by merely rotating the structural member to reverse front and rear positions.

Flange 9 is normal to the plane of front extension 6 of panel 2. Flange 9 is co-extensive in length and width with nearest connecting wall 7 and is parallel to wall 7. An open flange receiving cavity 11 is therefore present between walls 9 and 7 and front extension 6. As will be seen, the width of the inside of cavity 11 as defined between walls 7 and 9 is such that cavity 11 can receive flange 8 of another identical structural member.

As illustrated, flange 9 has a distal end or head 12 having an inside surface facing cavity 11 which is angled inwardly toward cavity 11 thereby widening the thickness of flange wall 9 in the direction toward front extension 6 to which flange wall 9 is joined. Head 12 ends abruptly at ledge 10 which is formed with flange wall 9.

Flange 8 includes a side wall 13 normal to the plane of rear extension 5 of panel 2. Side wall 13 is co-extensive in length and width with nearest connecting wall 7 and parallel thereto. The end of side wall 13 remote from rear extension 5 is formed with or attached to an inwardly depending base wall 14 normal to side wall 13. Base wall 14 is co-planar with the nearest non-extension end section 15 of the panel 2 to which side wall 13 is not attached.

The end of base wall 14 distal to side wall 13 is formed with or attached to a lip 16 which depends downwardly toward rear extension 5 to which side wall 13 is attached. Preferably, the area where lip 16 is joined to base wall 14 is thinned as compared to the base wall and lip so as to create a resilient flex point 17 about which lip 16 can flex.

As illustrated, the length of base wall 14 is such that a gap is left between lip 16 and nearest connecting wall 7. The gap is of a size which can snugly receive projection or flange wall 9 of another panel. The length of lip 16 must not be so long as to extend beyond ledge 10 of a flange wall 9 when flange 8 is completely received within cavity 11 (which occurs when base wall 14 makes wall to wall contact with extension end section 6) (see FIG. 2). Preferably, lip 16 is of a length such that it would snugly fit between ledge 10 and front extension 6 when flange 8 is completely received within cavity 11 so that wall to wall contact of the flange 8 with the receiving cavity walls (i.e., 7, 6 and 9) is made.

Figure 1:
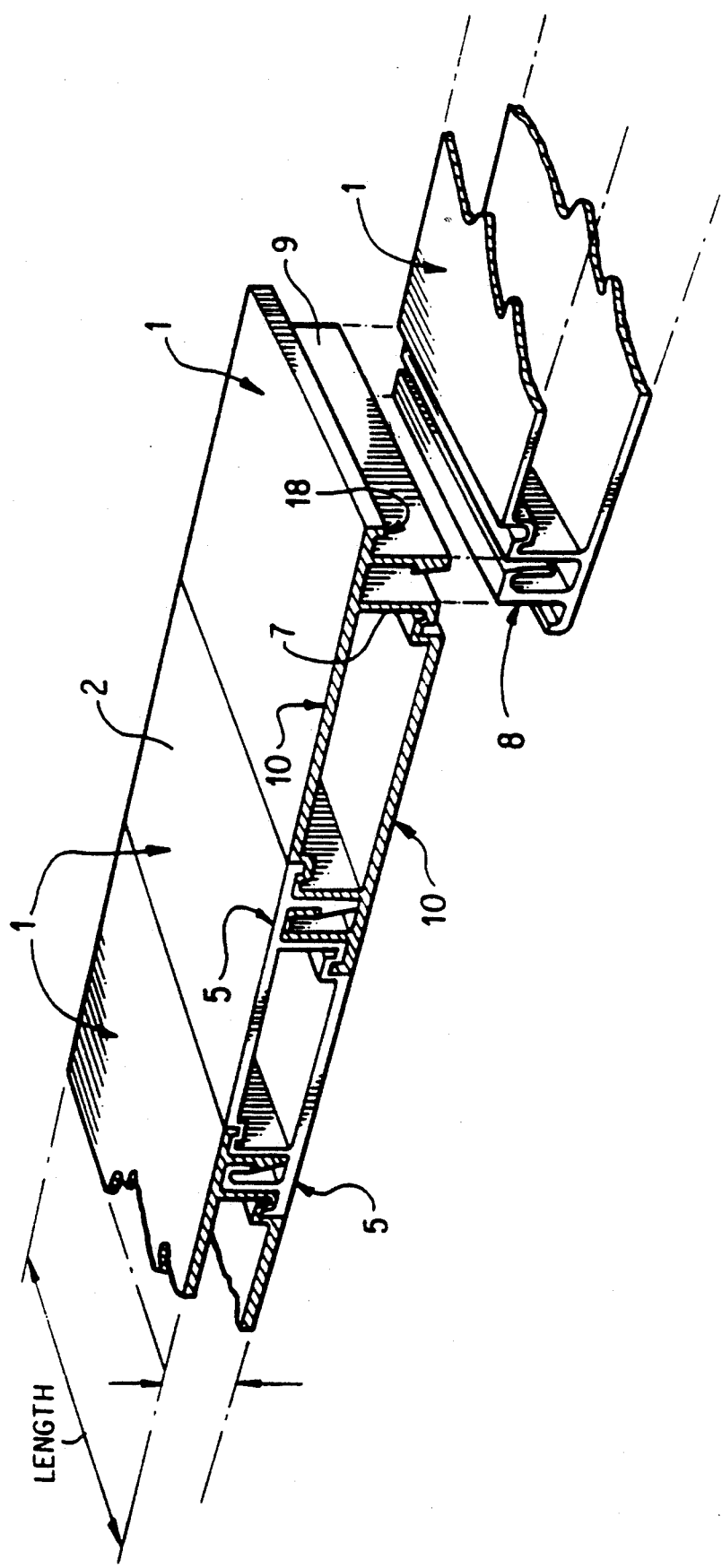
FIG. 1 is a perspective view of structural members of the invention assembled in end to end fashion to form a double wall.

When walls 32 of each panel 2 have a thickness, the non-extension end section 15 of each wall 2 is displaced inwardly toward the opposing panel to accommodate the thickness of an adjoining panel when the structural members are joined (see FIGS. 1 and 2). The extent of displacement should be equal to the thickness of walls 2. The reason for the displacement is to allow for space for the rear extension or the front extension (as the case may be) of an adjoining structural member when structural members are joined end to end (see FIG. 2). In this way, adjoining panels of the assembled double wall structure will be co-planar as illustrated in FIG. 1.

Preferably, the end of each of the extensions 5, 6 is formed with or has attached thereto a small lip 18 which projects in a direction which is generally normal to the plane of the extension. Where such lips 18 are present, walls 2 are formed with a complementary groove 19 in wall 32 of non-extension end section 15. The groove 19 is of a size and shape so that it can snugly receive lip 18 of an adjoining structural member during assembly. The engagement of lip 18 with channel 19 of an adjoining structural member substantially prevents separation (i.e., by bending apart) of adjoining structural members which are interlocked. A further advantage of the engagement of lip 18 with groove 19 is that in the assembled double wall (of a container, for example), tension or compressive stress caused by loading will be transferred along adjacent panels along the full width of the double wall.

In order to interlock one structural member with another, flange 8 (or projection) of one panel is merely inserted into the receiving cavity 11 of another structural member. During the insertion step, lip 16 of flange 8 will flex as it moves past the head 12 of flange wall 9 of the adjoining structural member. As the end of lip 16 moves past ledge 10 the lip 16 will snap back to its normal non-flexed position thereby interlocking flange 8 and flange wall 9. Ledge 10 will therefore function to prevent easy separation of the interlocked structural members. As previously stated, the dimensions of the flanges are selected so that flange 8 fits snugly within cavity 11. In this way, wall to wall contact will be made by the walls and lip of flange 8 (i.e., 13, 14 and 16) with the walls of cavity 11 (i.e., 7, 6, and 9), respectively.

One advantage of the present invention is that the interlocked flanges provide a torturous path for air attempting to cross the double wall formed from the structural members. Thus, the double wall has excellent insulating-sealing properties. In order to further enhance the sealing properties of the double wall, a bead of adhesive/sealant 20 (for example, silicon) may be placed between the exterior of flange 8 and the interior of cavity 11. When the flanges are interlocked, the adhesive/sealant will spread between the flange walls. Of course, an adhesive will also function to help prevent separation of the structural members. Double sided tapes may be used in place of adhesive for this purpose.

The structural member of the invention may be constructed of aluminum which has the advantage of being recyclable. Preferably the double wall construction described above is extruded from 6061 or 6063 aluminum. The structural member may also be extruded from other recyclable metals, plastics or composite materials. Instead of extrusion, the structural member may be mechanically formed (i.e., bent) from a sheet.

Figure 3:
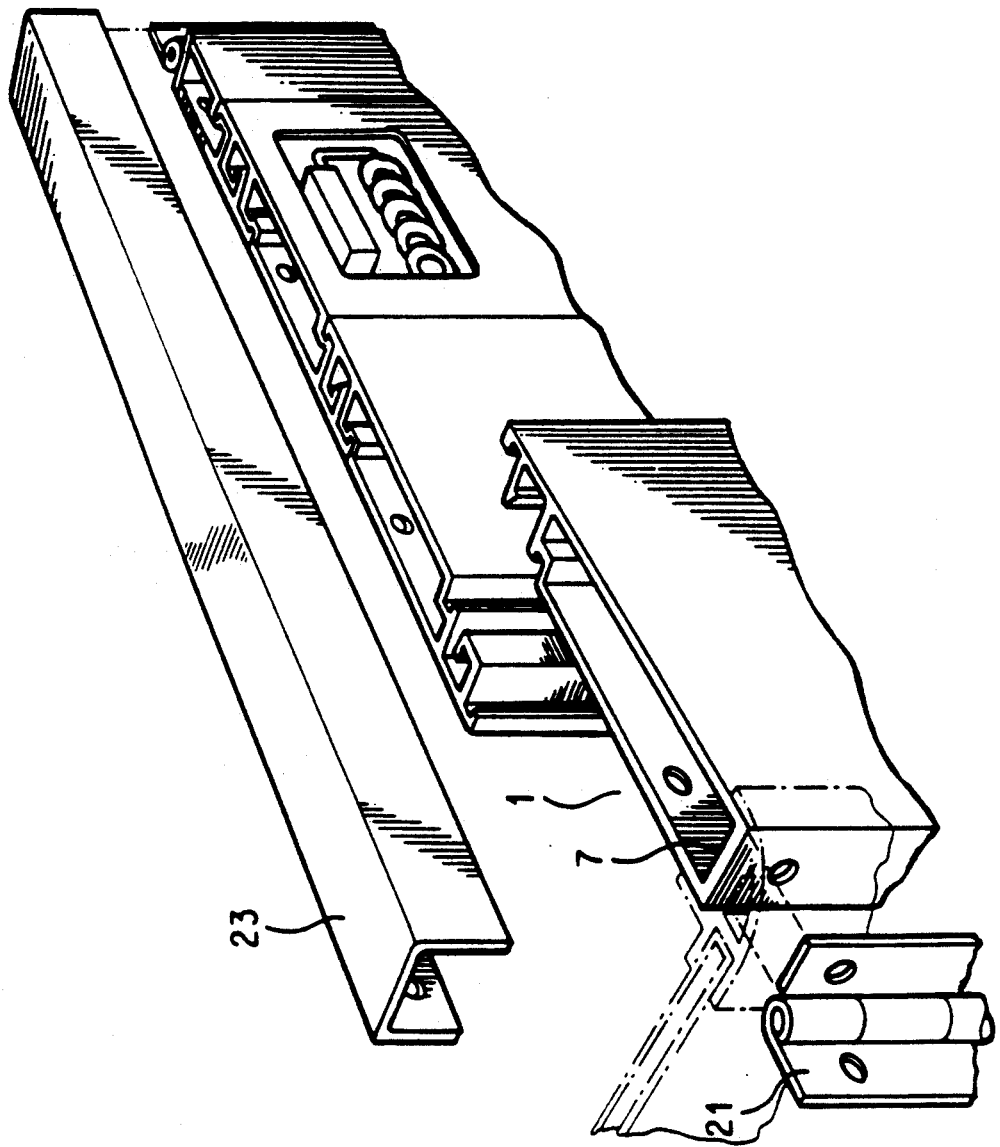
FIG. 3 is an angular view of two hinged container walls and an elongated channelled member used to cover the top of a double wall.
Figure 4:
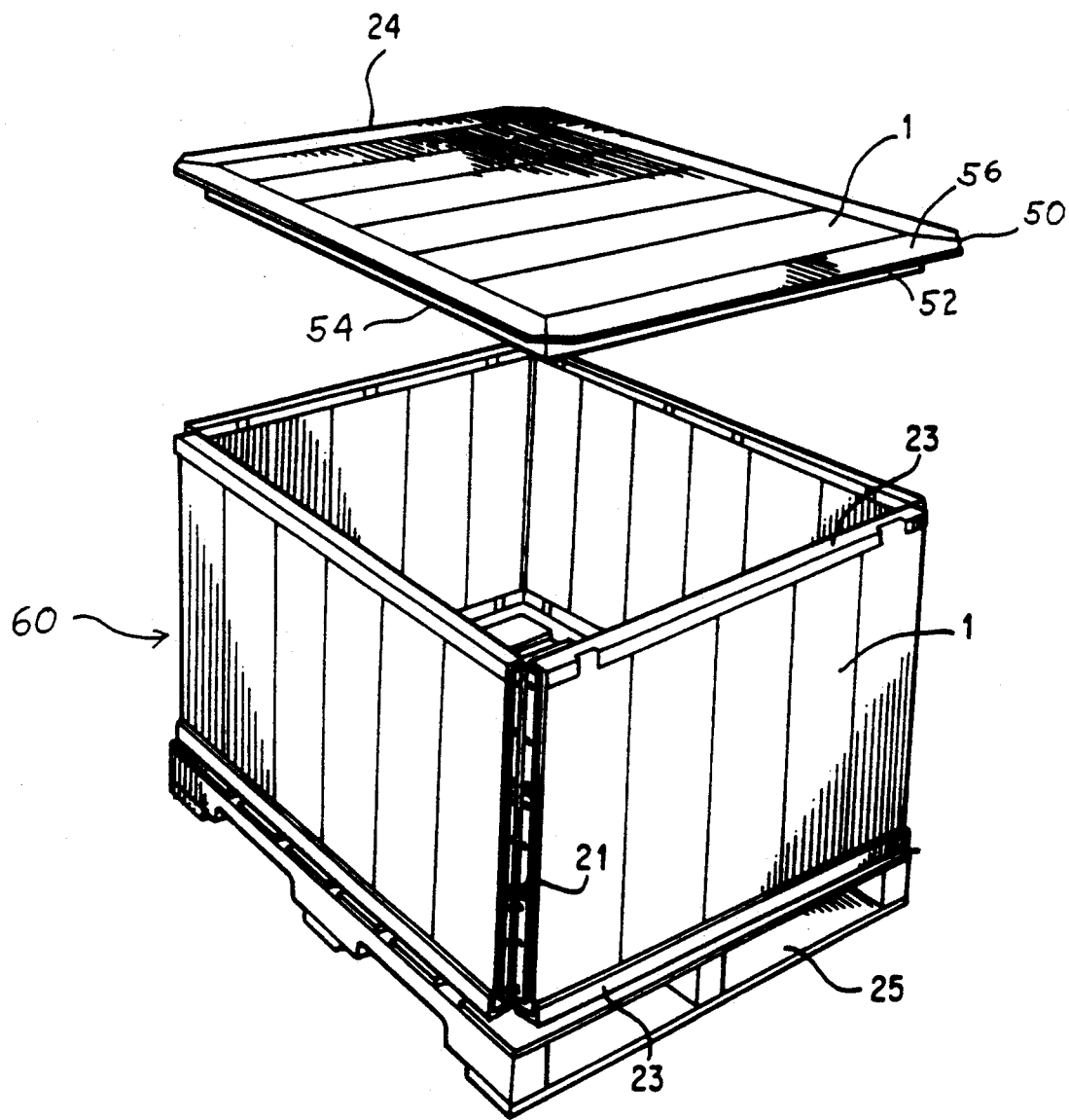
FIG. 4 illustrates a foldable assembled container on a pallet in accordance with the invention.

Double walls assembled from the structural members of the present invention may be easily assembled into double wall containers (se FIG. 4). For this purpose, the structural members which are at the ends of each double wall should not have any extension 5 or 6 nor any flange 8 or 9 at one end so that the double wall can be more easily joined to another double wall. As illustrated in FIG. 3, these terminal structural members will terminate at connecting wall 7.

Figure 5:
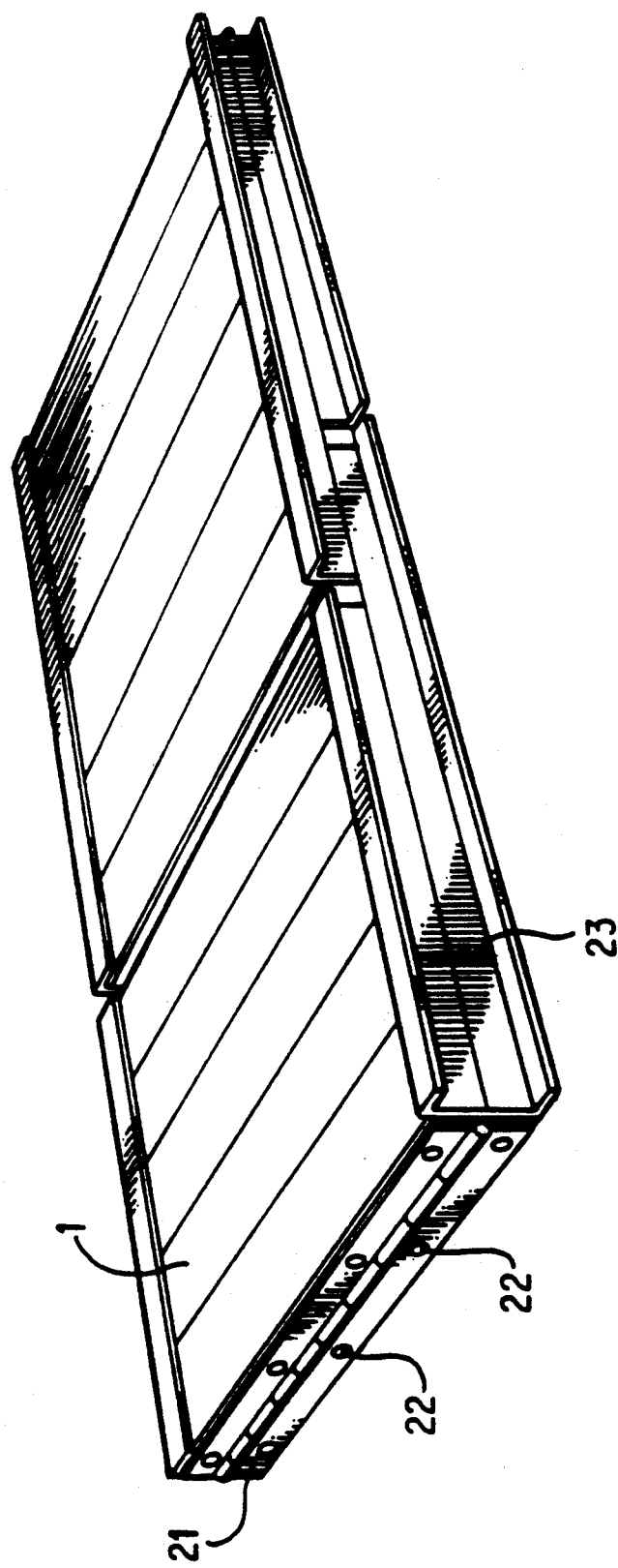
FIG. 5 illustrates the container of FIG. 4 in its folded compact position.

The end edge of each double wall is joined to an end edge of another double wall by a joint which is preferably a hinge 21 so that adjoined container walls may be folded over each other into a more portable flat structure (see FIG. 5). The walls can be joined to the joint or hinge 21 by rivets 22. Four double walls can be used to form the side walls of a container (see FIG. 4). A container floor can also be joined to the side walls by rivets.

Figure 6:
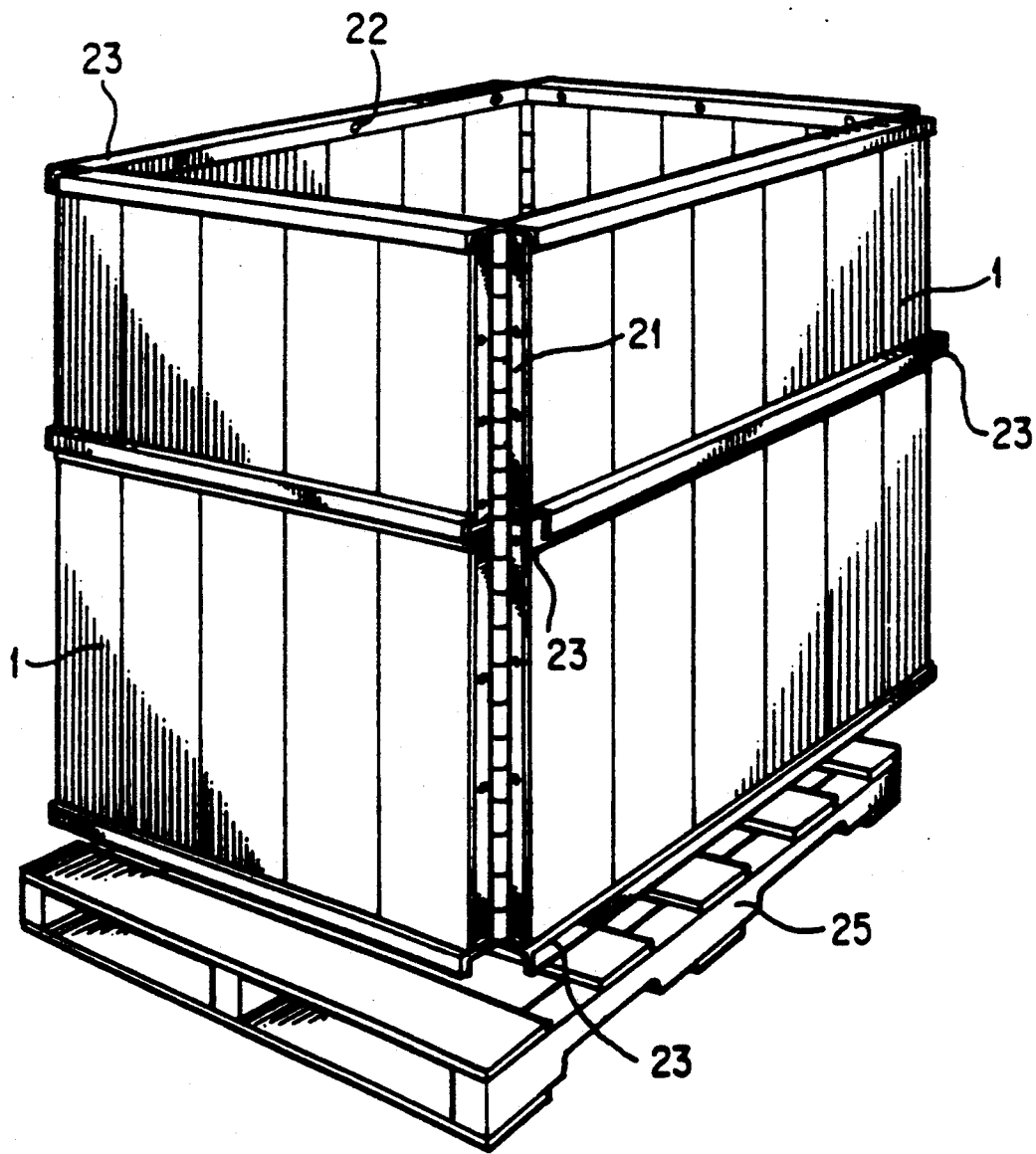
FIG. 6 illustrates two containers in accordance with the invention which are vertically stacked.

The top and bottom of the double wall panels can be covered by elongated channelled member 23 (see FIG. 3) for stability and protection. Rivets 22 can be used to attach the channelled member. For improved stability when the containers are vertically stacked (see FIG. 6), elongated channelled members can be attached to the bottom of the double walls so that the channels face outward rather than covering the wall. In this way, the channelled member on the bottom of a container wall can receive in its channel the top of a container wall stacked beneath it. This arrangement improves the lateral stability of stacked containers. It should be appreciated that none important advantage of the present invention is that the double wall structural members provide containers with substantial vertical stacking strength.

The container lid or cover 24 may also be formed from the double wall structural member of the invention (see FIG. 4). The lid in this case is comprised of several interlocked panels secured together in the same fashion as side members of the container. But, instead of the ends being hinged otherwise secured by an adjacent side, a "Z" flange 50 is utilized. Each "Z" flange is formed from a first leg that extends over the surface a side surface of the adjacent panel. Second leg 54 extends outwardly, preferably coextensive with a surface of side 24. These legs 52, 54 are joined by intermediate leg 56 having a length corresponding to the thickness of the panels used in forming a wall. The length of each panel in the leg 24 covers points to one internal dimension of container 60. As shown in FIG. 4, six (6) panels are secured together to have length slightly less than the other, in this case the length, dimension of container 60. Each edge of lid 24 has secured thereto "Z" flange 50. In this manner, when the lid 24 is fitted over open end of container 60, the exposed surface of legs 52, 54 fit fits smugly against internal surfaces of channels 23. Legs 56 extend over top of channels 23 to cover the opening and hold the lid in place. Once fitted over the opening, the lid or cover may be strapped to the container or a conventional catch and strike may be used.

One preferred container which can be constructed has four side double walls joined at 90° angles at their edges by hinges 21 (see FIG. 4). Elongated channelled members 23 are attached to the bottom of the container walls so that their channels face outward as described in the preceding paragraph. The channelled members can be secured to a pallet 25 which will serve as the container floor. The container can be removed from the pallet and easily folded up as illustrated in FIG. 5.

The containers of the present invention can be constructed in advance according to specifications and then shipped to a loading or shipping site. Alternatively, the structural members of the invention can be shipped in kits and then assembled on location. One advantage of the invention is that a strong double wall container can be easily assembled at a loading or shipping location to accommodate varying load sizes and/or the varying dimensions of transporting vehicles and goods.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than a restrictive sense.

What is claimed is:

1. An end-to-end interlockable panel for assembling a container wall comprising:
   a pair of first and second parallel sidewalls, the sidewalls being staggered in a longitudinal direction so that an extension end section of each sidewall extends in the longitudinal direction beyond a non-extension end of the other sidewall wall;
   a pair of parallel connecting walls, each containing wall joining the non-extension end of a sidewall to the other sidewall;
   a receiving flange wall extending from the extension end section of the first sidewall so as to define an open flange receiving cavity between the connecting wall nearest to the receiving flange, wall, said extension end section and the receiving flange wall; and
   a projection flange extending from the extension end of said second sidewall, said projection flange displaced from a connecting wall to accommodate said receiving flange wall, said projection flange defining a base wall being co-planar with the second sidewall, which is not attached to said second sidewall, a lip attached to said base wall extending toward the first wall of said extension end section to which the flange is fixed, said lip terminating at an end before reaching said extension end section of said first sidewall, said lip and said nearest connecting wall defining a gap therebetween which is of a size that is could snugly receive a receiving flange wall of another identical panel; said flange receiving cavity and said projection flange being of dimensions and being adapted such that the flange receiving cavity could completely receive the projection flange of another identical panel so as to make wall to wall contact with the flange.

2. The panel according to claim 1 wherein said flange wall is normal to the extension end section to which it belongs, is parallel to the connecting walls, and has length and thickness dimensions which are the same as each of the connecting walls.

3. The panel according to claim 1 wherein the side wall of the receiving flange is normal to the extension end section to which it belongs and is normal to the base wall and is parallel to the connecting walls.

4. The panel according to claim 3 wherein said lip of said projecting flange is parallel to the sidewall of the receiving flange and to the connecting walls.

5. The panel according to claim 3 wherein said receiving flange wall has a head section, opposite to its point of attachment to the extension end section to which it belongs, and a remainder section, the head section having a thickness which increases in the direction toward said remainder section to a point of maximum thickness where said head section terminates so as to define a ledge with the remainder section of the flange wall.

6. The panel according to claim 5 wherein the projection flange has length and thickness dimensions such that it could snugly fit between the ledge and the extension end section to which the flange wall of another identical structural member belongs when the projection flange is completely received within the flange receiving cavity of said identical structural member so that the flange lip makes contact with the remainder section of the receiving flange wall of said identical structural member.

7. The panel according to claim 6 wherein the flange lip is parallel to the sidewall of the receiving flange and to the connecting walls.

8. The panel according to claim 6 wherein the flange lip can flex, from an original position with respect to the base wall, about a flex point where the lip extends from the base wall, in response to movement of the head section of the flange wall of another identical structural member past the flange lip when the flange receiving cavity of said identical structural member receives the flange, and then snap back to its original position so as to make contact with the remainder section of the flange wall of said identical structural member when the flange is completely received in the flange receiving cavity.

9. The panel according to claim 8 wherein the flange lip has a thickness at the flex point which is less than a uniform thickness of said base wall.

10. The panel according to claim 8 wherein the panel is aluminum.

11. The panel according to claim 6 wherein the panel extension end section associated with the flange wall has a portion which extends beyond the flange wall in a direction away from the connecting walls and the panel extension end section associated with the flange has a portion which extends beyond the side wall in a direction away from the connecting walls.

12. The panel according to claim 11 wherein each of said panels has a uniform thickness and wherein each of said panels has a non-extension end section which is displaced by a distance equal to said panel thickness in an inward direction toward the other panel, each displaced non-extension end section having length and width dimensions equal to length and width dimensions of the portion of the panel extension and section which extends beyond the flange wall and equal to length and width dimensions of the portion of the panel extension end section which extends beyond the side wall.

13. The panel according to claim 12 wherein each panel non-extension end section has a channel at the point where it is displaced from its panel and wherein each of the portion of the panel extension end section which extends beyond the flange wall and the portion of the panel extension end section which extends beyond the sidewall has an end lip which is adapted to be snugly received within the channel of another identical panel when the flange of the panel is completely received within the flange receiving cavity of said identical panel.

14. The panel according to claim 8 wherein the panel extension end section associated with the flange wall has a portion which extends beyond the flange wall in a direction away from the connecting walls and the panel extension end section associated with the flange has a portion which extends beyond the side wall in a direction away from the connecting walls.

15. The panel according to claim 14 wherein each of said panels has a uniform thickness and wherein each of said panels has a non-extension end section which is displaced by a distance equal to said panel thickness in an inward direction toward the other panel, each displaced non-extension end section having length and width dimensions equal to length and width dimensions of the portion of the panel extension end section which extends beyond the flange wall and equal to length and width dimensions of the portion of the panel extension end section which extends beyond the side wall.

16. The panel according to claim 15 wherein each panel non-extension end section has a channel at the point where it is displaced from its panel and wherein each of the portion of the panel extension end section which extends beyond the flange wall and the portion of the panel extension end section which extends beyond the sidewall has an end lip which is adapted to be snugly received within the channel of another identical panel when the flange of the panel is completely received within the flange receiving cavity of said identical panel.

17. A foldable container comprising:
a first container wall having a first end and a second end;
a second container wall having a first end and a second end;
said first and second container walls being hingedly connected along an end-to-end interlockable first end of each container wall;
each container wall having a panel comprising
a pair of first and second parallel sidewalls, the sidewalls being staggered in a longitudinal direction so that an extension end section of each sidewall extends in the longitudinal direction beyond a non-extension end of the other sidewall;
a pair of parallel connecting walls normal to the sidewalls, each connecting wall joining the non-extension end of a sidewall to the other sidewall;
a receiving flange extending from the extension end section of the first sidewall so as to define an open flange receiving cavity between the connecting wall nearest to the flange wall, said extension end section and the flange wall; and
a projection flange extending from the extension end of said second sidewall, said projection flange displaced from a connecting wall to accommodate said receiving flange, said projection flange defining a base wall being co-planar with the second sidewall, which is not attached to said second side wall, a lip attached to said base wall extending toward the first wall of said extension end section to which the flange is fixed, said lip terminating at an end before reaching said extension end section of said first sidewall, said lip and said nearest connecting wall defining a gap therebetween which is of a size that it could snugly receive a projection flange wall of another identical panel; said flange receiving cavity and said projection flange being of dimensions and being adapted such that the flange receiving cavity could completely receive the projection flange of another identical panel.

18. The foldable container according to claim 17 further comprising a third container wall and a fourth container wall;
said third container wall being hingedly connected to said first container wall and said fourth container wall;
said fourth container wall being hingedly connected to said second container wall and said third container wall, such that said container walls are moveable from an orthogonal position for containing goods to a fold-up position for transporting said walls.

19. The foldable container according to claim 18 wherein each of said first and second container walls further comprise a plurality of said panels;
at least said first container wall having an upper edge and a lower edge;
a first channel for fitting over said upper edge for stabilizing said panels in said first container wall.

20. The foldable container according to claim 19 wherein said second container wall, said third container wall, and said fourth container wall, each contains a plurality of said panels and further comprising a second, third and fourth channel for fitting over corresponding edges of said second, third and fourth container walls for stabilizing said panels in each respective wall.

21. The foldable container according to claim 17 further comprising a cover being dimensioned to cover said container when arranged in said orthogonal configuration.

22. The foldable container according to claim 21 wherein said cover comprises a number of said panels and said cover having a length and width dimension slightly less than the corresponding length and width dimension of said container when arranged in an orthogonal configuration, a flange connected to the periphery of said cover for extending over the upper edges of said first, second, third and fourth container walls.

23. The foldable container according to claim 18 further comprising securing means for removably securing said container to a pallet where said pallet forms a floor with respect to said container.

24. The foldable container according to claim 18 wherein at least said first container wall has a lower edge;

an L-shaped channel having two legs attached to said lower edge, one leg of said channel extending downwardly and spaced laterally from said first container wall and parallel thereto for extending over a pallet having a dimension slightly greater than the dimensions of said container for extending over said pallet such that said pallet can form the floor of said container.

25. The foldable container according to claim 18 further comprising securing means for removably securing said container to an adjacent container in order to permit stacking of said container on said adjacent container.

26. The foldable container according to claim 18 wherein at least said first container wall has a lower edge;

an L-shaped channel having two legs attached to said lower edge and one leg of said channel extending downwardly and spaced laterally from said first container wall and parallel thereto for extending over a portion of a container wall defining an upper edge of another container.

27. The foldable container according to claim 18 wherein said container includes first, second, third and fourth container walls wherein each wall has lower edges in coplanar relationship;

first, second, third and fourth channels corresponding with the lower edge of said first, second, third and fourth container walls, each channel having a downward extending lip in spaced relationship from its corresponding wall and parallel thereto for extending over the edge of an adjacent container in abutting relationship with an exterior container wall of said container to permit stacking of said container on top of said adjacent container.

28. A rigid container having first, second, third and fourth container walls, a rigid connecting means for connecting each of said container walls to an adjacent wall, each wall having end-to-end interlockable panels with each panel comprising:

a pair of first and second parallel sidewalls, the sidewalls being staggered in a longitudinal direction so that an extension end section of each sidewall extends in the longitudinal direction beyond a non-extension end of the other sidewall wall;

a pair of parallel connecting walls normal to the sidewalls, each connecting wall joining the non-extension end of a sidewall to the other sidewall wall thereby defining a cavity between the connecting walls and the sidewalls;

a receiving flange extending from the extension end section of the first sidewall so as to define an open flange receiving cavity between the connecting wall nearest to the flange wall, said extension end section and the flange wall; and a projection flange extending from the extension end of said second sidewall, said projection flange displaced from a connecting wall to accommodate said receiving flange, said projection flange defining a base wall being co-planar with the second sidewall which is not attached to said second side wall, a lip attached to said base wall extending toward the first wall of said extension end section to which the flange is fixed, said lip terminating at an end before reaching said extension end section of said first sidewall, said lip and said nearest connecting wall defining a gap therebetween which is of a size that it could snugly receive a projection flange wall of another identical panel; said flange receiving cavity and said projection flange being of dimensions and being adapted such that the flange receiving cavity could completely receive the projection flange of another identical panel.

29. The rigid container according to claim 28 wherein said connecting means is a rigid, metal structure extending the full length of the container walls.

30. The rigid container according to claim 29 wherein each container wall has an upper edge and a lower edge, and a first end and a second end, generally perpendicular to said edges, said connecting means including said structure having a first channel with a bottom and two sides, and a second channel also with a bottom and two sides, said first channel configured for receiving said first end of said first container wall with said sides overlapping a portion of the container wall adjacent said first end and a second channel for receiving the second end of said second container wall with the sides of said second channel overlapping container wall portions adjacent said first end of said second container wall for rigidly fixing said first container wall to said second container wall.

31. The rigid container according to claim 30 wherein said channel is fixed by rivets to said first and second sidewalls.

32. The rigid container according to claim 31 wherein said structure includes a single extruded channel member extending the entire length of the ends of said walls.

33. The panel according to claim 1 wherein said connecting walls with said sidewalls define a cavity in said panel.

34. The container according to claim 17 wherein said connecting walls and said sidewalls define a cavity in said panel.

35. The container according to claim 28 wherein said connecting walls and said sidewalls define a cavity in said panel.

36. An end-to-end interlockable panel for assembling a container wall comprising:

a pair of first and second parallel sidewalls, the sidewalls being staggered in a longitudinal direction so that an extension end section of each sidewall extends in the longitudinal direction beyond a non-extension end of the other sidewall wall;

a pair of parallel connecting walls, each connecting wall joining the non-extension end of a sidewall to the other sidewall;

a receiving flange wall extending from the extension end section of the first sidewall so as to define an open flange receiving cavity between the connecting wall nearest to the receiving flange wall, said extension end section and the receiving flange wall; and a projection flange extending from the extension end of said second sidewall, said projection flange displaced from a connecting wall to accommodate said receiving flange wall, said projection flange defining a base wall being co-planar with the second sidewall and, which is not attached to said second sidewall, said base wall and said nearest connecting wall defining a gap therebetween which is of a size that it could snugly receive a receiving flange wall of another identical panel; said flange receiving cavity and said projection flange being of dimensions and being adapted such that the flange receiving cavity could completely receive the projection flange of another identical panel so as to make wall to wall contact with the flange.

* * * * *